United States Patent
Singh et al.

(10) Patent No.: US 10,999,126 B2
(45) Date of Patent: *May 4, 2021

(54) FAILURE HANDLING FOR ACTIVE-STANDBY REDUNDANCY IN EVPN DATA CENTER INTERCONNECT

(71) Applicant: Juniper Networks, Inc., Sunnyvale, CA (US)

(72) Inventors: Tapraj Singh, San Ramon, CA (US); Wen Lin, Andover, MA (US); SelvaKumar Sivaraj, Sunnyvale, CA (US); Rukesh Dorai, Sunnyvale, CA (US); Sunesh Rustagi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,507

(22) Filed: May 22, 2020

(65) Prior Publication Data
US 2020/0287780 A1    Sep. 10, 2020

Related U.S. Application Data

(63) Continuation of application No. 15/085,533, filed on Mar. 30, 2016, now Pat. No. 10,666,500.

(51) Int. Cl.
*H04L 12/24*    (2006.01)
*H04L 12/723*    (2013.01)
(Continued)

(52) U.S. Cl.
CPC ...... *H04L 41/0659* (2013.01); *H04L 12/4633* (2013.01); *H04L 41/0668* (2013.01);
(Continued)

(58) Field of Classification Search
CPC . H04L 41/0659; H04L 45/22; H04L 12/4633; H04L 41/0668; H04L 43/0811;
(Continued)

(56) References Cited

U.S. PATENT DOCUMENTS 8,014,275 B1    9/2011    Sundt et al.
8,953,590 B1    2/2015    Aggarwal et al.
(Continued)

OTHER PUBLICATIONS

Boutros et al., "VXLAN DCI Using EVPN," Internet Draft, draft-boutros-bess-vxlan-evpn-00.txt, Jul. 4, 2015, 16 pp.
(Continued)

*Primary Examiner* — Hassan Kizou
*Assistant Examiner* — Abdullahi Ahmed
(74) *Attorney, Agent, or Firm* — Shumaker & Sieffert, P.A.

(57) ABSTRACT

Techniques are described for avoiding traffic black-holing in a multi-homed Ethernet virtual private networks (EVPNs) in which a customer device (CE) is multi-homed to a plurality of multi-homing provider edge devices (PEs) via respective links of an Ethernet segment. An overlay network is created over the Ethernet segment, and the multi-homing PEs of the EVPN are configured with a common anycast IP address for respective virtual network interfaces. Upon election as active designated forwarder (DF) for the EVPN, the DF PE of the multi-homing PEs advertises toward the customer network an IGP metric for the anycast IP address that is lower than the IGP metric(s) advertised by any of the non-DF standby PE routers segment to direct the CE to forward network packets from the customer network to the DF PE over the respective link of the Ethernet segment.

20 Claims, 4 Drawing Sheets

(51) Int. Cl.
*H04L 12/741* (2013.01)
*H04L 12/721* (2013.01)
*H04L 12/703* (2013.01)
*H04L 12/46* (2006.01)
*H04L 12/707* (2013.01)
*H04L 12/26* (2006.01)

(52) U.S. Cl.
CPC .......... *H04L 43/0811* (2013.01); *H04L 45/22* (2013.01); *H04L 45/28* (2013.01); *H04L 45/50* (2013.01); *H04L 45/66* (2013.01); *H04L 45/74* (2013.01)

(58) Field of Classification Search
CPC ......... H04L 45/28; H04L 45/74; H04L 45/50; H04L 45/66
See application file for complete search history.

(56) References Cited

U.S. PATENT DOCUMENTS

| | | | |
|---|---|---|---|
| 9,019,814 | B1 | 4/2015 | Mohanty et al. |
| 10,666,500 | B2* | 5/2020 | Singh .................. H04L 41/0659 |
| 2006/0209682 | A1 | 9/2006 | Filsfils et al. |
| 2007/0217419 | A1* | 9/2007 | Vasseur .................. H04L 12/66 370/392 |
| 2009/0113057 | A1* | 4/2009 | Van der Merwe ........................... H04L 29/12349 709/227 |
| 2011/0032945 | A1 | 2/2011 | Mullooly et al. |
| 2014/0078886 | A1 | 3/2014 | Shukla et al. |
| 2015/0043581 | A1 | 2/2015 | Devireddy et al. |
| 2016/0352633 | A1* | 12/2016 | Kapadia .............. H04L 12/4633 |
| 2017/0085488 | A1* | 3/2017 | Bhattacharya ...... H04L 41/0806 |
| 2017/0126587 | A1* | 5/2017 | Ranns .................. H04L 47/825 |
| 2017/0141963 | A1* | 5/2017 | Chalapathy ......... H04L 12/4641 |
| 2018/0109436 | A1* | 4/2018 | Sajassi ................ H04L 41/0893 |

OTHER PUBLICATIONS

Aggarwal et al., "BGP MPLS Based Ethernet VPN," Network Working Group Internet Draft, draft-ietf-l2vpn-evpn-00, Feb. 24, 2012, 39 pp.

Sajassi et al., "PBB-EVPN with Anycast IP Tunnels," BESS Workgroup Internet Draft, draft-sajassi-bess-pbb-evpn-anycast-ip-tunnels-00, Oct. 19, 2015, 11 pp.

Sajassi et al., "BGP MPLS-Based Ethernet VPN," RFC 7432, Internet Engineering Task Force (IETF), Feb. 2015, 56 pp.

"Configuring VXLAN BGP EVPN," Cisco Nexus 9000 Series NX-OS VXLAN Configuration Guide, Release 7.x, Jan. 27, 2015, 42 pp.

"EVPN Control Plane and VXLAN Data Plane Feature Guide for QFX5100 Switches," Juniper Networks, Inc., Oct. 27, 2015, 94 pg.

"Configuring Ethernet VPNs," Juniper Networks, Inc., Nov. 15, 2015, 109 pp.

"VXLAN Network with MP-BGP EVPN Control Plane Design Guide," Cisco Sytems, Inc., Mar. 2015, 44 pp.

Carlniger, "Nexus 9000 VXLAN-EVPN, vPC, and VXLAN Routing," Come Route With Me!, https://comeroutewithme.com/2015/05/16/nexus-9000-vxlan-evpn-vpc-and-vxlan-routing, May 16, 2015, 15 pp.

Prosecution history of U.S. Appl. No. 15/085,533, dated Jan. 2, 2018 through Jan. 10, 2020, 130 pp.

* cited by examiner

FAILURE HANDLING FOR ACTIVE-STANDBY REDUNDANCY IN EVPN DATA CENTER INTERCONNECT

This application is a continuation of U.S. application Ser. No. 15/085,533, filed Mar. 30, 2016. The entire content of application Ser. No. 15/085,533 is incorporated herein by reference.

TECHNICAL FIELD

The invention relates to computer networks and, more specifically, to forwarding network traffic within computer networks.

BACKGROUND

A data center is a specialized facility that provides data serving and backup as well as other network-based services for subscribers and other entities. A data center in its most simple form may consist of a single facility that hosts all of the infrastructure equipment, such as networking and storage systems, servers, redundant power supplies, and environmental controls.

More sophisticated data centers may be provisioned for geographically dispersed organizations using subscriber support equipment located in various physical hosting facilities (sites). As a result, techniques have been developed to interconnect two more physical data centers to form a single, logical data center. One example layer two (L2) interconnect is an Ethernet virtual private network (EVPN) data center interconnect (DCI) through an intermediate network coupling multiple physical data centers.

An EVPN DCI is often used to extend two or more remote layer two (L2) customer networks of geographically separate data centers through an intermediate layer three (L3) network in a transparent manner, i.e., as if the intermediate L3 network does not exist. The EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) (also referred to as pseudowires) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the data centers.

With active-standby EVPN multi-homing, a customer edge device may be multi-homed to the EVPN by an Ethernet segment provided by multiple PE network devices. That is, the multiple PE network devices are coupled to the data center by separate access links that logically operate as a single Ethernet segment and, therefore, provide multi-homed connectivity to the EVPN for one or more customer networks within the local data center. In an active-standby configuration however, only one of the multiple PE network devices in the Ethernet segment operates as a designated forwarder (DF) with respect to each EVPN instance running over the Ethernet segment and forwards inbound Ethernet frames for that EVPN instance from the EVPN toward the multi-homed customer network using the Ethernet segment.

SUMMARY

In general, techniques are described for avoiding traffic black-holing in a multi-homed Ethernet virtual private network (EVPN) data center interconnect (DCI) between multiple data centers networks due to a failure of the designated forwarded (DF) in an active-standby multi-homing configuration. In some examples, multi-homing provider edge devices (PEs) of the EVPN for a multi-homed customer network are configured with a common anycast IP address for the respective virtual network interfaces of a data center virtual overlay network operating according to an overlay tunneling protocol, such as Virtual Extensible Local Area Network (VXLAN), Network Virtualization using Generic Route Encapsulation (NVGRE), and Stateless Transport Tunneling (STT). Upon election as active designated forwarder (DF) for an Ethernet segment/virtual network of the overlay for the customer network, a DF PE of the multi-homing PEs unblocks traffic forwarding for the Ethernet segment/virtual network and advertises toward the customer network an IGP metric for the anycast IP address that is lower than the IGP metric(s) advertised by any of the non-DF standby PE routers. Because a lower IGP metric indicates a lower cost and is treated as a shorter routing distance by routing protocols, a customer network device multi-homed to the PEs receives remote customer network traffic from the active DF and learns that the remote customer devices are reachable via the anycast IP address.

The active DF may subsequently experience a failure condition, such as failure of the active DF itself, Ethernet segment failure, or core network isolation. In response to detecting a failure of the active DF, the PEs elect for the Ethernet segment a new DF, which then advertises to the multi-homed customer network the lower IGP metric for the anycast IP address. The previous DF transitions to a standby non-DF and advertises an IGP metric that is higher than the IGP metric advertised by the new active DF. The new IGP metrics for the IGP network links to the active DF and standby non-DF cause the customer network device multi-homed to the PEs to begin forwarding traffic to the remote customer devices via the new DF PE, despite having previously received traffic from the remote customer devices via a PE that has transitioned to the role of the standby non-DF.

The techniques may have one or more advantages. For example, because the PE interfaces for the data center overlay are configured with a common anycast IP address, the techniques may permit the customer network devices to avoid relearning remote customer device media access control (MAC) addresses as reachable through the new DF. This may be particularly useful where a remote customer device is no longer sending traffic through the PE, and in deployments with customer network devices that are unable to detect PE device failure and perform a MAC flush in response. In addition, modifying the IGP metrics as described herein ensures that the customer network device directs traffic bound for the remote customer network-bound to the DF that is actively forwarding traffic in the active-standby PE configuration.

In one example, a method comprises executing, with a provider edge device (PE) of a plurality of PEs coupled to a multi-homed customer edge device (CE) by an overlay network formed over an active-standby multi-link Ethernet segment, an Ethernet Virtual Private Network (EVPN) instance to provide an EVPN over an intermediate network to one or more remote provide edge devices. The method further includes participating, with the PE device, in a designated forwarder (DF) election of one of the PEs for forwarding packets from the EVPN to the customer network by the Ethernet segment. The method further includes, responsive to the PE being elected the DF, outputting, with the PE according to an interior gateway protocol (IGP) routing protocol, an IGP message specifying a metric for reaching a virtual network interface of the PE by a respective link of the Ethernet segment to direct the CE to forward network packets from the customer network to the PE.

In another example, a PE comprises a network interface connected to one of a plurality of links of an Ethernet segment by which the PE is one of a plurality of PEs coupled to a multi-homed customer edge device (CE). The PE further includes one or more processors configured to execute an Ethernet Virtual Private Network (EVPN) instance to provide an EVPN over an intermediate network to one or more remote provide edge devices. The processor is configured to participate in a designated forwarder (DF) election of one of the PEs for forwarding packets from the EVPN to the customer network by the Ethernet segment. The process is further configured to, responsive to being elected the DF, output, according to an interior gateway protocol (IGP) routing protocol, an IGP message specifying a metric for reaching the PE by the respective link of the Ethernet segment to direct the CE to forward network packets from the customer network to the PE.

In another example, a non-transitory computer-readable medium comprises instructions for causing a programmable processor of a network device to perform the methods described herein.

The details of one or more examples are set forth in the accompanying drawings and the description below.

BRIEF DESCRIPTION OF DRAWINGS

Like reference characters denote like elements throughout the figures and text.

DETAILED DESCRIPTION

Figure 1:
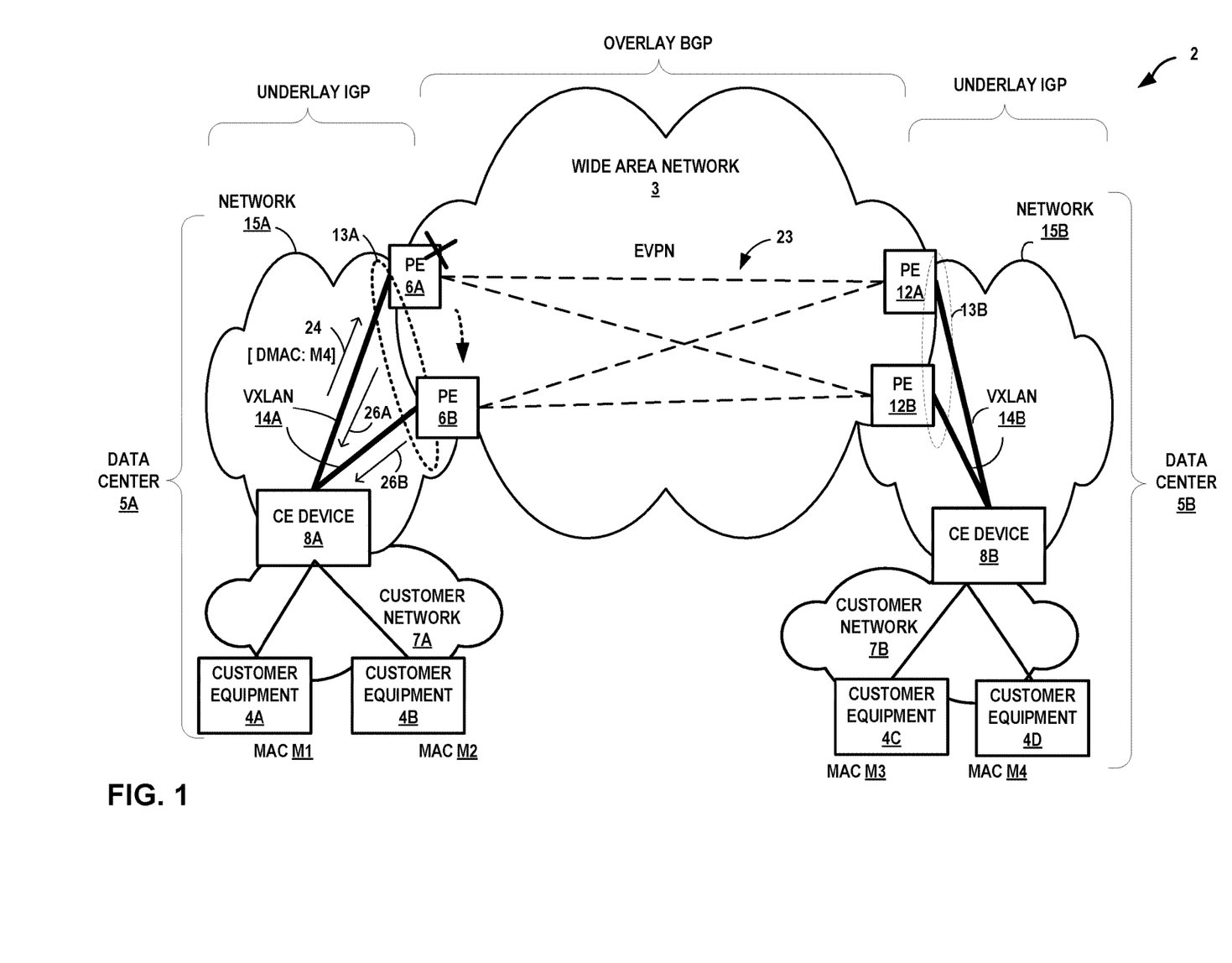
FIGS. 1-2 are block diagrams illustrating an example network system in which provider edge devices provide data center interconnect using Ethernet Virtual Private Network (EVPN) technologies according to techniques described in this disclosure.
Figure 2:
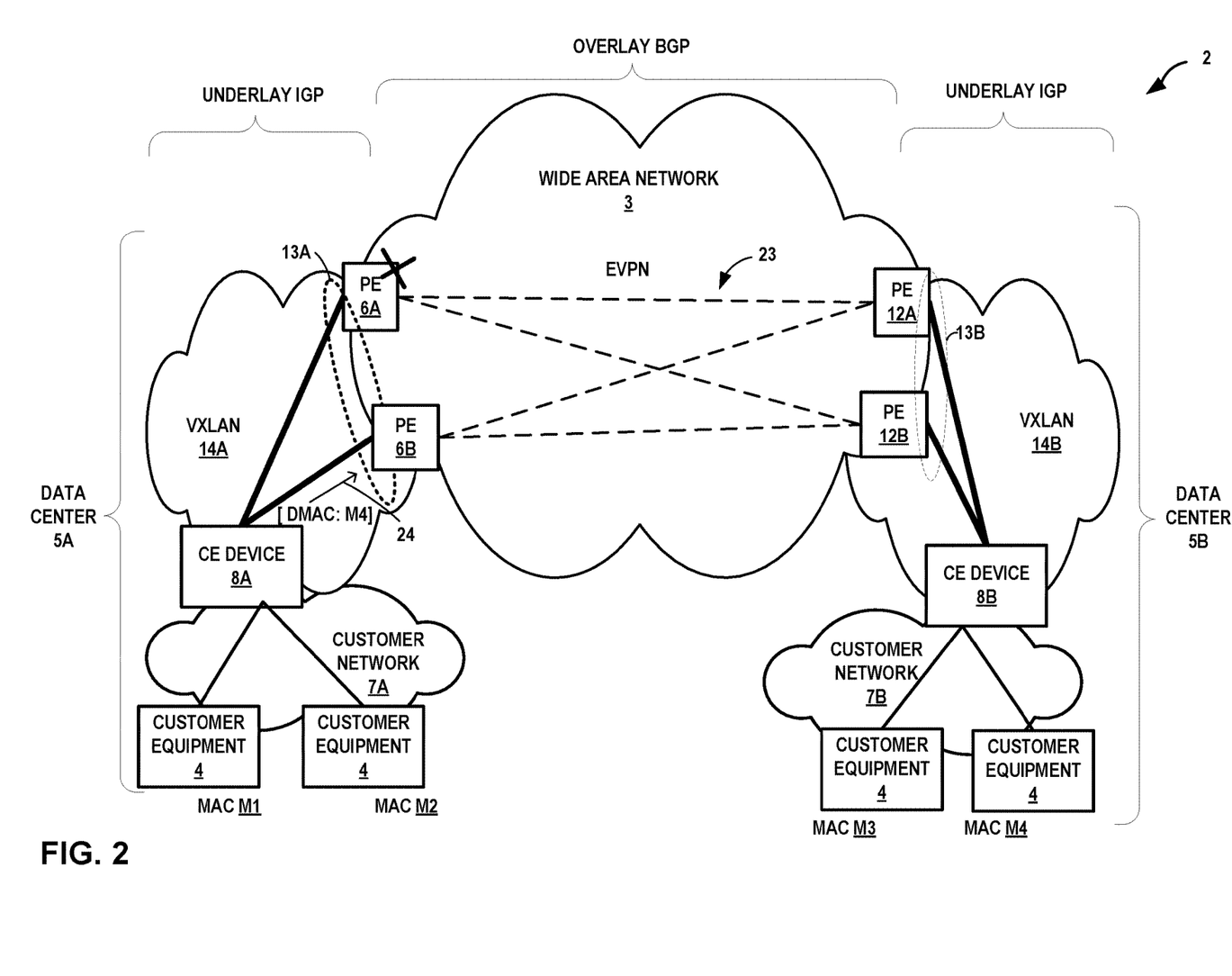

FIGS. 1-2 are block diagrams illustrating an example network system in which provider edge devices provide data center interconnect using Ethernet Virtual Private Network (EVPN) technologies according to techniques described in this disclosure. In the example of FIG. 1, data centers 5A-5B (collectively, "data centers 5") represent networks having specialized facilities that provide storage, management, and dissemination of data to customers and other entities. Example data centers 5A, 5B includes a plurality of physical and/or logical customer networks having customer equipment, such as customer networks 7A, 7B having customer equipment 4A-4D (collectively, "customer equipment 4") that provide computing environments for customers. Customer equipment 4 may be co-located in or otherwise connect to data centers 5 to request and receive services and data provided by data centers 5. In some instances, data centers 5A, 5B are geographically dispersed facilities, or "sites," of an overall data center to provide geographical redundancy against localized failure of one of the data centers.

In this example, data centers 5 are interconnected by a wide area network (WAN) 3. In general, WAN 3 represents a layer three (L3) network and may include multiple intermediate routing and switching devices (not shown) that transport data traffic over links between data centers 5. For example, wide area network 4 may implement Multiprotocol Label Switching (MPLS) techniques and may be referred to as an MPLS/IP network. While described as a wide area network, WAN 3 may represent any network capable of transmitting traffic exchanged between provider edge routers (PEs) 6.

For example, provider edge routers (PEs) 6A-6B and 12A-12B (collectively, "PEs 6, 12") may utilize Ethernet VPN (E-VPN) technology over WAN 3 to provide an EVPN data center interconnect (DCI) between data centers 5A and 5B. In this way, PEs 6 provide an EVPN instance 23 (hereinafter "EVPN 23") to transport L2 communications for customer networks 7 of data centers 5 through an intermediate network (WAN 3), in a transparent manner, i.e., as if data centers 5 were directly bridged at layer 2.

In particular, each of PEs 6, 12 provide the EVPN 23 to transport L2 communications, such as Ethernet packets or "frames," through WAN 3 for one or more customer networks 7 of data centers 5. Moreover, customer equipment 4 of different customer networks 7 provided within each data center 5 may be virtually isolated into different Virtual Extensible LANs (VXLANs) 14. While described with respect to VXLAN as providing tunneling for the overlay virtual network, some examples of data centers 5 may use Network Virtualization using Generic Route Encapsulation (NVGRE), Stateless Transport Tunneling (STT), or other virtual network tunneling protocol.

Data centers 5 include respective networks 15A-15B, which each include transport switches that transport L2 communications for respective customer networks 7A, 7B using respective VXLANs 14A-14B for that customer. Each of networks 15 are underlay networks for VXLANs 14 and each locally implement a layer 3 interior gateway protocol (IGP) routing protocol for internally exchanging routing information among network 15 routers within the respective network. Networks 15 may be alternatively referred to herein as "IGP networks," "underlay networks," or "underlay IGP networks." Example IGPs routing protocols include Open Shortest Path First (OSPF), Intermediate System-to-Intermediate System (IS-IS), and Routing Information Protocol (RIP).

As such, PEs 6, 12 may receive customer traffic from local VXLANs 14 and forward the traffic through WAN 3 via the EVPN 23. Similarly, PEs 6 may receive tunneled L2 communications from EVPN 23 and forward the L2 communications via VXLANs 14 for transport through the local data centers 5 via the respective underlay networks 15.

Customer networks 7 reach the EVPN 23 provided by PEs 6, 12 via customer edge devices 8A, 8B having interfaces configured with VXLANs 14. PEs 6, 12 provide virtual L2 bridged connectivity between the CE devices 8 using EVPN 23. PEs 6, 12 may provide multiple EVPN instances in some examples. Each of CE devices 8 may represent a host (e.g. a real server or virtual machine executing on a real server), router, or switch.

In this way, PEs 6, 12 provide a multi-homed EVPN/VXLAN data center interconnect (DCI) between data centers 5. As such, each of PEs 6, 12 operates as gateway between EVPN 23 and VXLANs 14, and may function as VXLAN Tunnel Endpoints ("VTEPs") with respect to VXLANs 14. That is, each PE 6, 12 may include logically separate virtual routing and forwarding instances (VRFs) for VXLAN 14 and EVPN 23 and each operates to bridge traffic between the two distinct internal routing instances. Further example structural and functional details of a data center interconnection technology are described in "VXLAN DCI Using EVPN," draft-boutros-bess-vxlan-evpn-00.txt, Internet Engineering Task Force (IETF), Jul. 4, 2015; and "BGP MPLS-Based Ethernet VPN," Request for Comments 7432, IETF, February 2015, the entire contents of which are incorporated herein by reference.

As shown in FIG. 1, PEs 6 provide multi-homing access to WAN 3 to VXLAN 14A for Ethernet segment 13A. Data center-facing interfaces of PE routers 6 are configured as a logically bundled Ethernet segment 13A such that PEs 6 operate to provide active-standby (or "single-active") multi-homed L2 connectively to customer edge router (CE) 8A of data center 5A. For VXLAN, the data center-facing interfaces of PE routers 6 are source VXLAN Tunnel Endpoints (VTEPs), which are examples of data center-facing or customer-facing virtual network interfaces. PEs 6 may include more than 2 PE routers in some deployments, but only one PE 6 is active at any time.

One of the multiple PE devices in each of the Ethernet segments is elected to operate as a designated forwarder (DF) to forward inbound Ethernet frames from EVPN 23 to the customer network device 8A via the Ethernet segment, thereby avoiding traffic loops within VXLANs 14. For example, PE 6A may be elected the designated forwarder for Ethernet segment 13A with respect to unicast traffic as well as broadcast, unidentified unicast and multicast (BUM) traffic received from EVPN 23. As designated forwarder, PE 6A forwards the traffic into Ethernet segment 13A.

In accordance with techniques described in this disclosure, PEs 6 are configured with a common anycast IP address for the data center-facing interfaces that terminate VXLAN 14A on the PEs. In other words, respective data center-facing interfaces of PEs 6 have the same anycast IP address. For example, VTEPs of PEs 6 may be configured with a common anycast IP address.

In accordance with the techniques described herein, because PEs 6 are configured in active-standby redundancy for EVPN 23 and, more particularly, for Ethernet segment 13A, PEs 6 advertise different underlay IGP metrics (hereinafter, "metrics") to cause CE device 8A to send traffic destined for customer equipment of remote customer network 7B to the active PE 6 that is also the DF with respect to EVPN 23. Upon election as DF for EVPN 23, PE 6A uses the local IGP routing protocol to advertise a lower IGP metric into network 15A for the common anycast IP address for VXLAN 14A. Further, as a non-DF, PE 6B uses the local IGP routing protocol of network 15A to advertise a relatively higher IGP metric into network 15A for the common anycast IP address. As such, PEs 6A, 6B influence the forwarding of outbound traffic within local network 15A based on DF status of the PEs with respect to EVPN 23 of intermediate wide area network 3.

In some examples, CE device 8A may directly connect to PE 6A via an IGP link for which the CE device 8A and PE 6A are endpoints. Likewise, CE device 8A may directly connect to PE 6B via an IGP link for which the CE device 8A and PE 6B are endpoints. In other words, due to the common anycast IP address shared by PEs 6, the IGP path between CE device 8A and PEs 6 appear to be connected by a multiple links to the same IGP destination from the perspective of the IGP for network 15A, and the IGP metrics associated with the different links can be used to selectively control packet forwarding decisions made by the CE device when outputting packets to the PEs via the overlay network.

As the active DF, PE 6A may advertise a relatively low metric for the IGP link for reaching the common anycast IP address configured for PE 6A from CE device 8A. As the standby non-DF, PE 6B may advertise a relatively high metric for the IGP link for reaching the common anycast IP address configured for PE 6B from CE device 8A.

For OSPF as an IGP for network 15A, an IGP advertisement may be a Link State Advertisement, such as a Router-LSA, that describes the IGP link and specifies the metric. For RIP, an IGP advertisement may be a Request Message that describes the IGP link and specifies the metric. For IS-IS, an IGP advertisement may be a link-state packet that describes the IGP link and specifies the metric. In some examples, the higher metric is a maximum possible metric for the IGP, e.g., a MAX_IGP metric. In some examples, the lower metric (relative to the higher metric) is a minimum possible metric for the IGP, e.g., a MIN_IGP metric.

PEs 6 implement EVPN and thus receive, via a BGP overlay for WAN 3, remote customer Media Access Control (MAC) addresses learnt by PEs 12 over VXLAN 14B. As a result of the common anycast IP configuration, CE device 8A may learn remote MAC addresses as reachable from any of PEs 6. However, because PE 6A is initially the active DF in this example, PE 6A forwards unicast and broadcast, unidentified/unknown unicast, multicast (BUM) traffic sourced by MACs M3, M4 of customer equipment 4C, 4D (for instance) to CE device 8A. CE device 8A learns MAC M4, for instance, as reachable on VXLAN 14A via the common anycast IP address configured for the VXLAN 14A.

Because PE 6A is initially the active DF in this example and advertises a relatively lower IGP metric to itself from CE device 8A than that advertised by standby non-DF PE 6B, CE device 8A computes an IGP shortest path to the common anycast IP address to PE 6A. That is, CE device 8A determines the IGP link advertised by PE 6A with the relatively lower metric is a link in the shortest path to the common anycast IP address. CE device 8A therefore initially forwards L2 traffic 24 that is destined to MAC M4 on the VXLAN 14A via an outbound interface to PE 6A.

Subsequently, PE 6A may experience a failure condition (illustrated in FIG. 1) that prevents PE 6A from satisfying the requirements of an active DF for a multi-homed active-standby EVPN configuration, e.g., for DCI. Example failure conditions may include isolation from WAN 3 such that PE 6A is unable to send or receive network packets on WAN 3, failure of the data center-facing interface or IGP link or other Ethernet segment 13A failure with respect to PE 6A such that PE 6A is unable to send or receive packets on VXLAN 14A, and failure of the PE 6A itself. In some cases, non-DF PE 6B monitors a health of DF PE 6A via network 15A using a Bidirectional Forwarding Detection (BFD) or other Operation, Administration, and Maintenance (OAM) technique for detecting PE 6 failure.

In response to detecting the failure condition of the active DF PE 6A, the PEs 6 elect a new active DF PE 6B. In some examples, based on service configuration for PEs 6, the PEs 6, 12 exchange EVPN routes and based on route type 1 (i.e., Ethernet Auto-Discovery (A-D), which may be per Ethernet Segment Identifier) routes, and route type 4 (Ethernet segment) routes, PEs 6 may elect PE 6B as the new DF.

In response to being elected the new active DF, PE 6B unblocks core-to-VXLAN traffic forwarding for the Ethernet segment implemented at least in part by VXLAN 14A. In addition, PE 6B outputs IGP message 26B advertising the lower IGP metric for the common anycast IP address configured for VXLAN 14A into network 15A. The previous active DF, PE 6A, transitions to the role of standby non-DF for Ethernet segment 13A and outputs IGP message 26A advertising a relatively higher IGP metric for the common anycast IP address configured for VXLAN 14A into network 15A. IGP messages 26 may represent any of the aforementioned IGP advertisements for OSPF, IS-IS, RIP, or an IGP message for another IGP that advertises a link and link metric for the IGP.

CE device 8A receives the new IGP metrics for IGP links to PEs 6. FIG. 2 illustrates an operation of CE device 8A after having received IGP messages 26. CE device 8A recomputes the IGP shortest path to the common anycast IP address as on a network 15A-facing interface to the new active DF, PE 6B. Consequently and without having to update a MAC table for Ethernet segment 13A, CE device 8A begins forwarding L2 traffic on a network 15A-facing interface for VXLAN 14A to PE 6B. In the illustrated example, for instance, CE device 8A sends L2 traffic 24 that is destined to MAC M4 on the VXLAN 14A via an outbound interface to PE 6B.

For a failure condition that is a failure of PE 6A itself, PE 6A may be unable to send IGP message 26A advertising a higher IGP metric. However, because the IGP link from CE device 8A to PE 6A may eventually expire from the IGP database (e.g., link-state database), causing CE device 8A to send L2 traffic 24 that is destined to MAC M4 on the VXLAN 14A via an outbound interface to PE 6B.

Because the respective PE 6 interfaces for the data center overlay virtual network (VXLAN 14A in the example of FIG. 1) are configured with a common anycast IP address, the techniques may permit CE device 8A to avoid relearning remote customer device media access control (MAC) addresses as reachable through the new active DF, PE 6B. In cases in which, e.g., MAC M4 does not source L2 traffic to customer network 7A and the MAC M4 traffic is therefore not bi-directional between CE devices 8, such relearning may not be possible. The techniques may thereby avoid black-holing of traffic to MAC M4 that would otherwise occur in an active-standby redundancy configuration for EVPN DCI, such as that represented in network system 2 of FIGS. 1-2.

The techniques may in some cases avoid black-holing of traffic to, e.g., MAC M4 in deployments in which CE device 8A is unable to detect PE 6A failure and responsively perform a MAC flush to trigger unidentified unicast flooding and relearning of the MAC M4 to the PE 6B. This may reduce L2 flooding within network 15A. For example, CE device 8A may not support BFD or other OAM technique for detecting PE 6 failure. Alternatively or in addition, CE device 8A may be manufactured by a vendor that does not support or performs MAC flush in a manner that negatively affects network performance in network 15A. As such, by reducing L2 flooding, the techniques may improve network performance in network 15A.

In some cases, each virtual network interfaces for PEs 6 for a corresponding Ethernet segment (e.g., a VXLAN) may be configured with a different anycast IP address. In this way, PEs 6 may be perform the techniques of this disclosure with respect to multiple Ethernet segments on multiple different VXLANs.

Figure 3:
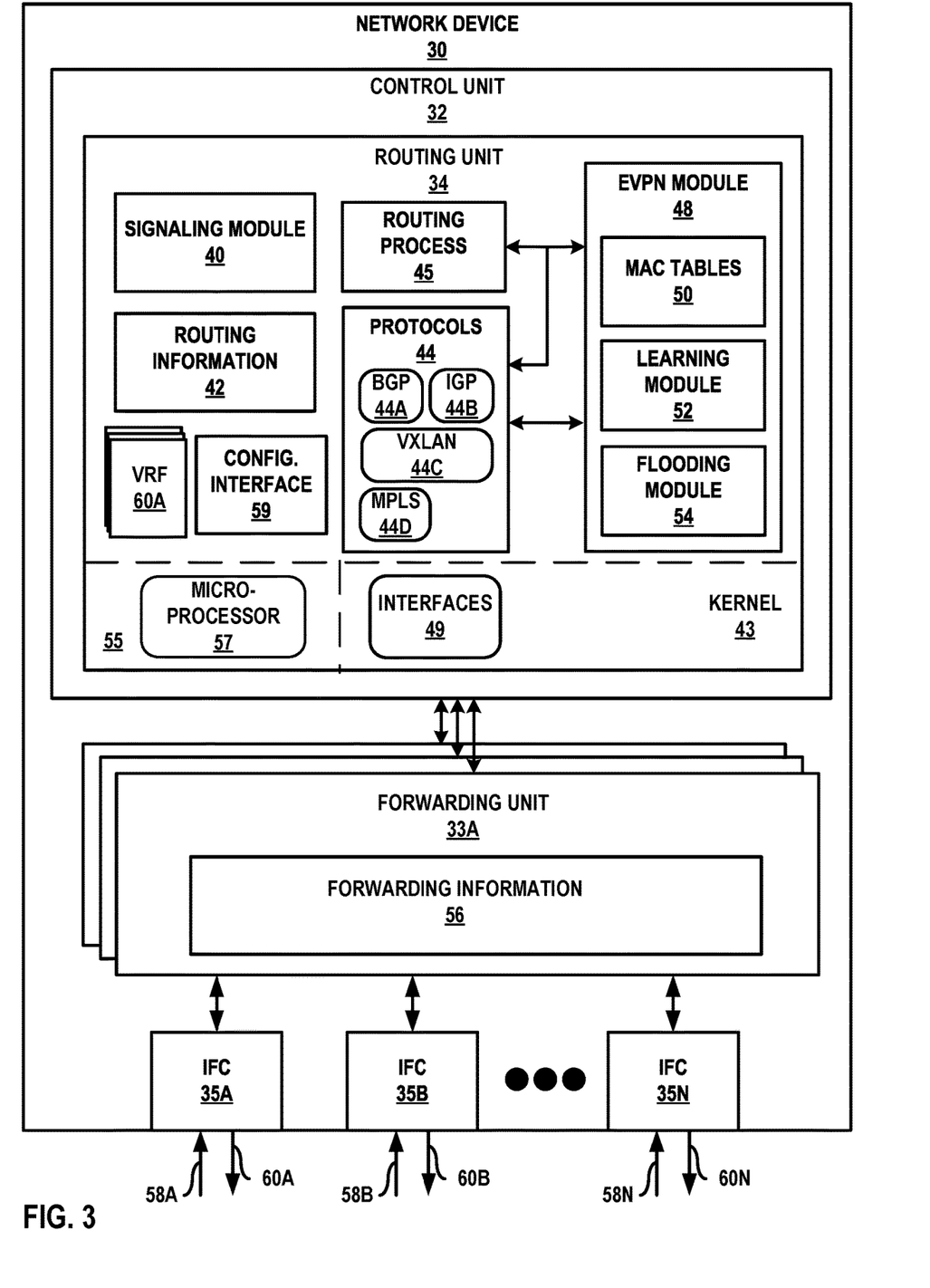
FIG. 3 is a block diagram illustrating an example network device configured to operate according to techniques described herein.

FIG. 3 is a block diagram illustrating an example network device configured to operate according to techniques described herein. Network device 30 may represent any of PEs 6 of FIGS. 1-2.

Network device 30 includes a control unit 32 that includes a routing engine 34, and control unit 32 is coupled to forwarding units 33A-33N. Each of forwarding engines 33 is associates with one or more of interface cards 32A-32N ("IFCs 32") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Elements of control unit 32 and forwarding units 33 may be implemented solely in software, or hardware, or may be implemented as combinations of software, hardware, or firmware. For example, control unit 32 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 32 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 30, e.g., protocols, processes, and module. Control unit 32, in some examples, retrieves and executes the instructions from memory for these aspects.

Routing unit 34 includes kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 55 of routing unit 34 includes microprocessor 57 that executes program instructions loaded into a main memory (not shown in FIG. 3) from a storage device (also not shown in FIG. 3) in order to execute the software stack, including both kernel 43 and processes executing on the operating environment provided by kernel 43. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 43 provides an operating environment for a routing process 45 that executes various protocols 44 at different layers of a network stack. For example, routing unit 34 includes network protocols that operate at a network layer of the network stack. In the example of FIG. 3, network protocols include the routing protocols Border Gateway Protocol (BGP) 44A and IGP 44B. BGP 44A may include Multiprotocol BGP (MP-BGP). Network protocols 44 also include VXLAN 44C and MPLS 44D. EVPN module 48 and routing process 45 execute routing protocols 44 to provide a EVPN DCI, such as VXLAN EVPN DCI or NVGRE EVPN DCI, in cooperation with other PE devices.

Routing unit 34 may include other protocols not shown in FIG. 3. Routing unit 34 is responsible for the maintenance of routing information 42 to reflect the current topology of a network and other network entities to which network device 30 is connected. In particular, routing protocols periodically update routing information 42 to accurately reflect the topology of the network and other entities based on routing protocol messages received by network device 30.

As shown in FIG. 3, network device 30 may be configured with multiple virtual routing and forwarding instances (VRFs) 60, including VRF 60A. VRF 60A is associated with a VRF table to store routing and forwarding information associated with the VRF. Network device 30 includes configuration interface 59 to receive configuration data for configuring network device 30, such as VRF 60 configuration data, EVPN configuration data, and routing configuration data.

Forwarding units 33A-33N ("forwarding units 33" or "forwarding engine 33") represent hardware and logic functions that provide high-speed forwarding of network traffic. Forwarding units 33 may include a set of one or more forwarding chips programmed with forwarding information that maps network destinations with specific next hops and the corresponding output interface ports. In general, when network device 30 receives a packet via one of inbound links 58, one of forwarding units 33 identifies an associated next hop for the data packet by traversing the programmed forwarding information based on information within the packet. One of forwarding units 33 (either the ingress forwarding engine or a different egress forwarding engine) forwards the packet on one of outbound links 60 mapped to the corresponding next hop.

In the example of FIG. 3, forwarding unit 33A includes forwarding information 56. In accordance with routing information 42, forwarding unit 33A stores forwarding information 56 that associates network destinations with specific next hops and corresponding interface ports. For example, routing unit 34 analyzes routing information 42 and generates forwarding information 56 in accordance with routing information 42. Forwarding information 56 may be maintained in the form of one or more tables, link lists, radix trees, databases, flat files, or any other data structures.

Forwarding unit 33A stores forwarding information 56 for each Ethernet VPN Instance (EVI) established by network device to associate network destinations with specific next hops and the corresponding interface ports. An EVI may be associated with one or more Ethernet Segments in an EVPN. In general, when network device receives a data packet on a core LSP for a given Ethernet segment via one of inbound links 58, forwarding engine 33A, for example, identifies an associated next hop for the data packet by traversing forwarding information 56 based on information (e.g., labeling information) within the packet. Forwarding engine 30A forwards the data packet on one of outbound links 60 to the corresponding next hop in accordance with forwarding information 56 associated with the Ethernet segment.

Routing unit 34 also includes an EVPN module 48 having flooding module 54 that performs flooding and a learning module 52 that performs layer two (L2) learning, e.g., learning of customer device MAC addresses from inbound Label Switch Paths (LSPs) and association of those customer MAC addresses with corresponding outbound LSPs and output interfaces. EVPN module 48 may receive such associations in MP-BGP messages in MAC/IP Advertisement route type specific EVPN Network Layer Reachability Information (NLRI) for the EVPN instance, for example. EVPN module 48 may maintain MAC tables 50 for each EVI established by network device 30, or in alternative examples may maintain one or more MAC tables that are independent of each respective EVI. Learning module 52 and flooding module 54 may alternatively be configured for execution, in full or in part, by forwarding unit 33A. In some examples, EVPN module 48 may be part of or executed by routing process 45.

Signaling module 40 outputs control-plane messages to automatically establish LSPs, Ethernet Segments, and otherwise provision one or more EVPNs between network device 30 and each of the other PE devices for the layer 3 core. Signaling module 40 may signal the PE devices using one or more suitable L3 protocols, such as the BGP. Signaling module 40 can communicate with forwarding unit 33A to automatically update forwarding information 56. In some examples, signaling module 40 may be part of or executed by routing process 45.

EVPN module 48 executes in the control plane of network device 30 and performs MAC address learning to automatically update portions of forwarding information 56 for each EVI established by network device 30. In some examples, EVPN module 48 is invoked when network device 30 receives data packets on the LSPs established by router network device 30 for one or more of the PE 10 that are members of an EVI. EVPN module 48 performs MAC address learning using learning module 52 and updates the one of MAC tables 50 to initially record associations between the LSPs connected to network device 30 and the customer source MAC addresses of the EVPN customer devices from which the data packets were received on the LSPs. For example, the one of MAC tables 50 records LSP identifiers that identify the LSPs connected to network device 30, and records MAC addresses that identify the source customer devices of the data packets transmitted over the LSPs. In effect, router network device 30, an L3 routing device (or in some examples, an L2 switching device), learns associations between MAC addresses and LSPs (which are mapped to ports or interfaces), much as an L2 switch learns associations between MAC addresses and ports. Forwarding information 56 may represent a virtual port binding and bridging table.

In order to update the one of the MAC tables 50, learning module 52 of EVPN module 48 in routing unit 34 performs L2 learning and association of L2 customer MAC addresses with specific LSPs. Learning module 52 then communicates information recorded in the one of MAC tables 50 to configure forwarding information 56. In this way, forwarding unit 33A may be programmed with associations between each LSP and output interface and specific source customer MAC addresses reachable via those LSPs. EVPN module 48 may communicate with forwarding units 33 to update the one of MAC tables 50 associated with the EVPN to associate the customer MAC addresses with the appropriate outbound LSP. In some examples, forwarding unit 33A may maintain local MAC tables (not shown). After the update, MAC tables 50 include associations between the LSPs connected to network device 30 that are used to transport L2 traffic to the MAC addresses of the customer devices. In other words, MAC tables 50 records associations between the LSPs and the network devices to which data packets may be sent on the LSPs. For example, MAC tables 50 may record LSP identifiers that identify the LSPs sourced by network device 30, and for those LSP identifiers that identify the MAC addresses of the reachable customer devices.

Forwarding unit 33A receives data packets on inbound links 58 that are destined for one of the PE routers in the EVPN. Forwarding unit 33A determines whether the destination customer MAC address of the data packets is included in the one of MAC tables associated with the EVPN. If the MAC address is included in the one of MAC tables, then network device 30 forwards the data packets to the destination PE router on the LSP associated with the MAC address based on forwarding information 56 associated with the EVPN. If the customer MAC address is not included in the one of MAC tables, network device 30 floods the data packets to all of the PE routers via the LSPs based on forwarding information 56 associated with the EVPN.

EVPN module 48 additional manages the EVPN multi-homing mode of operation for network device 30. That is, EVPN module 48 operates to maintain EVPN service and traffic forwarding to and from CE devices multi-homed to network device 30 and one or more other routers (e.g., another of PEs 6 in the example topology of FIGS. 1-2). For example, in examples in which network device 30 is operating as an instance of PE 6A, in the event of a failure event such as a PE 6A-CE 8 failure; a failure of PE 6A; or an MPLS-reachability or other type of tunneling failure between PE 6A and a remote PE 12 causing core isolation; EVPN module 48 coordinates with PE 6B to ensure that one of PEs 6 is in an active mode and the other is in a standby mode for a given EVPN instance. EVPN module 48 may coordinate with PE 6B to elect a new designated forwarder for an Ethernet segment implemented at least in part using VXLAN 14A.

In response to network device 30 being elected a designated forwarder (DF) for the Ethernet segment, EVPN module 48 may unblock traffic for the Ethernet segment and direct routing process 45 to reduce an IGP metric for an anycast address configured for the virtual network interface for the Ethernet segment. Routing process 45 may subsequently output an IGP advertisement for the link to cause one or more CE devices for the Ethernet segment to direct Ethernet segment traffic to network device 30 instead of a previous DF.

In response to network device 30 relinquishing a role as DF to assume a role of non-DF for the Ethernet segment, EVPN module 48 may direct routing process 45 to increase an IGP metric for the common anycast IP address configured for the virtual network interface for the Ethernet segment. Routing process 45 may subsequently output an IGP advertisement for the link to cause one or more CE devices for the Ethernet segment to direct Ethernet segment traffic to the new DF instead of to network device 30. In this way, network device 30 may avoid traffic black-holing for L2 traffic on the Ethernet segment destined for a remote customer network, where the network device 30 and other PE devices for the Ethernet segment are configured to operate in an active-standby redundancy mode.

Figure 4:
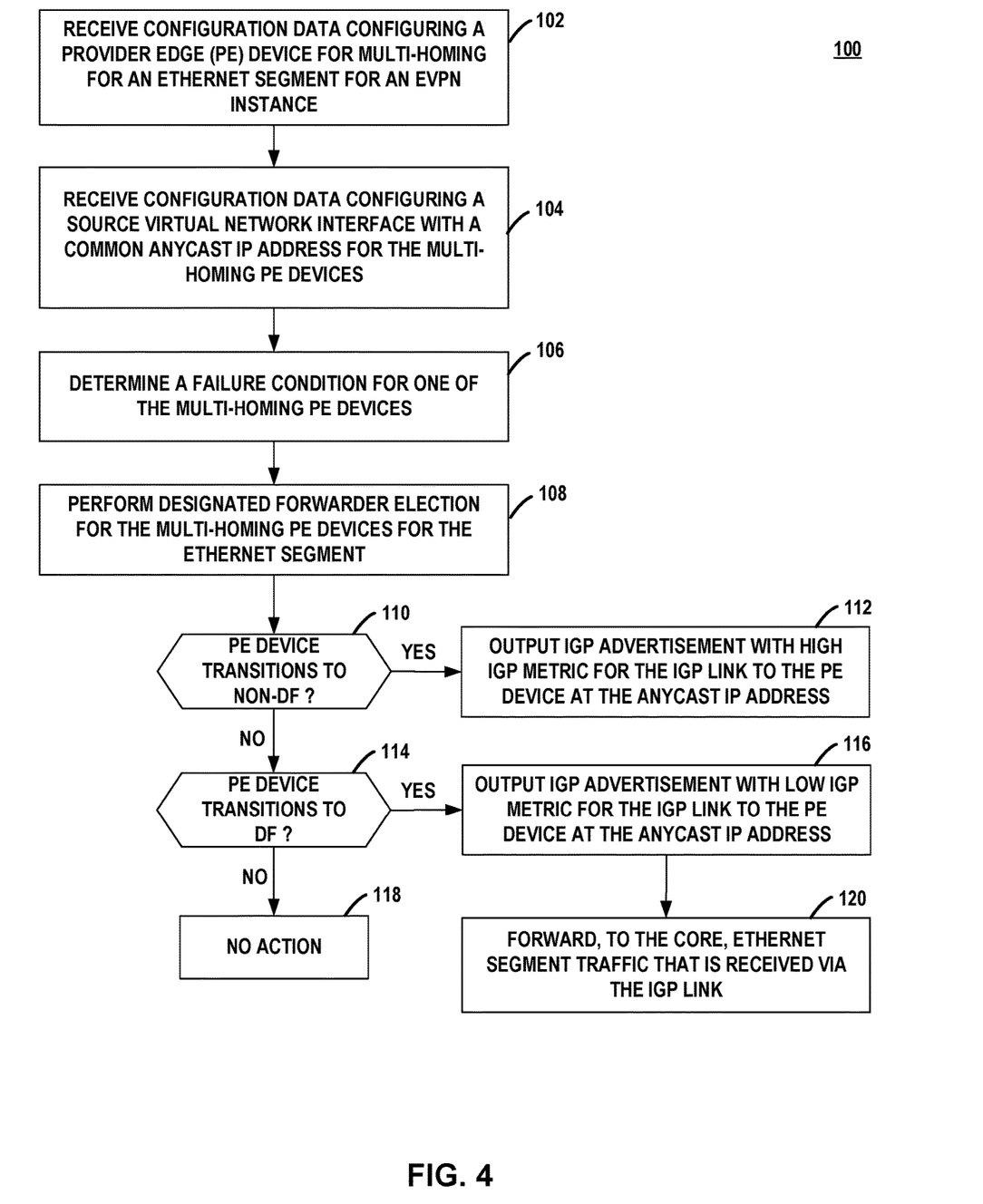
FIG. 4 is a block diagram illustrating an example mode of operation for a network device according to techniques described in this disclosure.

FIG. 4 is a block diagram illustrating an example mode of operation for a network device according to techniques described in this disclosure. Operation 100 is described with respect to PE 6A of FIGS. 1-2 but may be performed by any network device described in this disclosure.

PE 6A receives configuration data configuring the PE 6A to multi-home, with PE 6B, CE device 8 for an Ethernet segment for EVPN 23 (102). PE 6A also receives configuration data configuring a virtual network interface for VXLAN 14A with a common anycast IP address for the virtual network interfaces of PEs 6 for VXLAN 14A (104).

PE 6A may determine that one of PEs 6 is in a failure condition (106). PE 6A and PE 6B perform designated forwarder election to determine a new designated forwarder for the Ethernet segment (108). If PE 6A was previously the designated forwarder and another PE (e.g., PE 6B) is elected the new designated forwarder (YES branch of 110), PE 6A may modify its routing information to increase a routing cost from CE device 8A to PE 6A on network 15A. PE 6A may output an indication of the increased routing cost by outputting an IGP advertisement with a high IGP metric for the IGP link to the common anycast IP address configured for PE 6A (112).

If PE 6A was previously a non-designated forwarder and PE 6A is elected a new DF (YES branch of 114), PE 6A unblocks traffic forwarding for the Ethernet segment and may modify its routing information to decrease a routing cost from CE device 8A to PE 6A on network 15A. PE 6A may output an indication of the decreased routing cost by outputting an IGP advertisement with a low IGP metric for the IGP link to the common anycast IP address configured for PE 6A (116). PE 6A, as a result, subsequently receives traffic from CE device 8 for the Ethernet segment (by VXLAN 14A over the IGP link) and forwards the traffic to WAN 3 using EVPN 23. If PE 6A was previously a non-DF and was not elected DF (NO branch of 118), PE 6A does not modify its routing information to change the routing cost from CE device 8A to PE 6A on network 15A.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A method comprising:
   receiving, with a provider edge device (PE) of a plurality of PEs coupled to a multi-homed customer edge device (CE) for a customer network by an overlay network formed over an active-standby multi-link Ethernet segment, configuration data for an Ethernet Virtual Private Network (EVPN) instance to provide an EVPN over an intermediate network with one or more remote PEs; and
   outputting, with the PE in response to a designated forwarder (DF) election to elect a DF for forwarding packets for the EVPN, an interior gateway protocol (IGP) routing protocol message comprising an indication of a routing distance for reaching a virtual network interface of the PE for the overlay network by a link of the Ethernet segment.

2. The method of claim 1,
   wherein, if the DF election elects the PE as the DF for forwarding packets for the EVPN, the indication of the routing distance comprises a value selected to cause the CE to forward subsequent network packets from the customer network to the PE, and
   wherein, if the DF election elects a different PE as the DF for forwarding packets for the EVPN, the indication of the routing distance comprises a value selected to cause the CE to forward subsequent network packets from the customer network to the different PE.

3. The method of claim 1,
   wherein, if the DF election elects the PE as the DF for forwarding packets for the EVPN, the indication of the routing distance comprises a MAX_IGP metric having a maximum permissible value for the IGP routing protocol to cause the CE to forward subsequent network packets from the customer network to the PE, and
   wherein, if the DF election elects a different PE as the DF for forwarding packets for the EVPN, the indication of the routing distance comprises MIN_IGP metric having a minimum permissible value for the IGP routing protocol to cause the CE to forward subsequent network packets from the customer network to the different PE.

4. The method of claim 1, further comprising receiving, by the PE, configuration data configuring a common anycast Internet Protocol (IP) address for the virtual network interface, wherein the common anycast IP address is assigned by each of the plurality of PEs to respective virtual network interfaces for the overlay network for respective links of the Ethernet segment that connects each of the plurality of PEs to the CE.

5. The method of claim 1, further comprising:
   receiving, by the PE and from the one or more remote PEs, a Border Gateway Protocol (BGP) message that includes an association of a Multiprotocol Label Switching (MPLS) label and a media access control (MAC) address for a remote customer device;
   receiving, by the PE at the virtual network interface and from the CE device, a layer 2 packet destined to the MAC address for the remote customer device; and
   sending, by the PE to the one or more remote PEs and based on the association of the MPLS label and the MAC address for the remote customer device, a labeled packet that encapsulates the layer 2 packet in the MPLS label.

6. The method of claim 5, wherein the BGP message comprises a MAC/Internet Protocol (MAC/IP) Advertisement route type specific EVPN Network Layer Reachability Information for the EVPN instance.

7. The method of claim 1, wherein an overlay tunneling protocol for the overlay network comprises one of Virtual Extensible Local Area Network (VXLAN), Network Virtualization using Generic Route Encapsulation (NVGRE), or Stateless Transport Tunneling (STT).

8. The method of claim 1,
   wherein the EVPN instance comprises an EVPN data center interconnect (DCI) of a first data center comprising the plurality of PEs,
   wherein a second data center comprises the one or more remote PEs, and
   wherein the one or more remote PEs of the second data center are connected to the plurality of PEs of the first data center via the intermediate network.

9. The method of claim 1,
   wherein the PE comprises a first PE, and
   wherein the method further comprises:
      determining, by the first PE, a failure condition for a second PE of the plurality of PEs; and
      triggering, by the first PE in response to determining the failure condition for the second PE of the plurality of PEs, the DF election.

10. The method of claim 9, wherein determining the failure condition comprises determining the failure condition based on one of:
    an indication of core isolation from the intermediate network such that the second PE is unable to send or receive network packets on the intermediate network;
    an indication that the second PE is unable to send or receive packets on the overlay network; or
    an indication that the second PE has failed.

11. A provider edge device (PE) comprising:
    a network interface connected to a link of an active-standby multi-link Ethernet segment by which the PE is one of a plurality of PEs coupled to a multi-homed customer edge device (CE) for a customer network by an overlay network formed over the Ethernet segment; and
    one or more processors configured to receive configuration data for an Ethernet Virtual Private Network (EVPN) instance to provide an EVPN over an intermediate network with one or more remote PEs,
    wherein the one or more processors are further configured to output, in response to a designated forwarder (DF) election to elect a DF for forwarding packets for the EVPN, an interior gateway protocol (IGP) routing protocol message comprising an indication of a routing distance for reaching a virtual network interface of the PE for the overlay network by a link of the Ethernet segment.

12. The PE of claim 11,
wherein, if the DF election elects the PE as the DF for forwarding packets for the EVPN, the indication of the routing distance comprises a value selected to cause the CE to forward subsequent network packets from the customer network to the PE, and
wherein, if the DF election elects a different PE as the DF for forwarding packets for the EVPN, the indication of the routing distance comprises a value selected to cause the CE to forward subsequent network packets from the customer network to the different PE.

13. The PE of claim 11,
wherein, if the DF election elects the PE as the DF for forwarding packets for the EVPN, the indication of the routing distance comprises a MAX_IGP metric having a maximum permissible value for the IGP routing protocol to cause the CE to forward subsequent network packets from the customer network to the PE, and
wherein, if the DF election elects a different PE as the DF for forwarding packets for the EVPN, the indication of the routing distance comprises MIN_IGP metric having a minimum permissible value for the IGP routing protocol to cause the CE to forward subsequent network packets from the customer network to the different PE.

14. The PE of claim 11, wherein the one or more processors are further configured to receive configuration data configuring a common anycast Internet Protocol (IP) address for the virtual network interface, wherein the common anycast IP address is assigned by each of the plurality of PEs to respective virtual network interfaces for the overlay network for respective links of the Ethernet segment that connects each of the plurality of PEs to the CE.

15. The PE of claim 11, wherein the one or more processors are further configured to:
receive, from the one or more remote PEs, a Border Gateway Protocol (BGP) message that includes an association of a Multiprotocol Label Switching (MPLS) label and a media access control (MAC) address for a remote customer device;
receive, at the virtual network interface and from the CE device, a layer 2 packet destined to the MAC address for the remote customer device; and
send, to the one or more remote PEs and based on the association of the MPLS label and the MAC address for the remote customer device, a labeled packet that encapsulates the layer 2 packet in the MPLS label.

16. The PE of claim 11, wherein an overlay tunneling protocol for the overlay network comprises one of Virtual Extensible Local Area Network (VXLAN), Network Virtualization using Generic Route Encapsulation (NVGRE), or Stateless Transport Tunneling (STT).

17. The PE of claim 11,
wherein the EVPN instance comprises an EVPN data center interconnect (DCI) of a first data center comprising the plurality of PEs,
wherein a second data center comprises the one or more remote PEs, and
wherein the one or more remote PEs of the second data center are connected to the plurality of PEs of the first data center via the intermediate network.

18. The PE of claim 11,
wherein the PE comprises a first PE, and
wherein the one or more processors are further configured to:
determine a failure condition for a second PE of the plurality of PEs; and
trigger, in response to determining the failure condition for the second PE of the plurality of PEs, the designated forwarder election for the EVPN instance.

19. The PE of claim 18, wherein the one or more processors are configured to determine the failure condition based on one of:
an indication of core isolation from the intermediate network such that the second PE is unable to send or receive network packets on the intermediate network;
an indication that the second PE is unable to send or receive packets on the overlay network; or
an indication that the second PE has failed.

20. A non-transitory computer-readable medium comprising instructions for causing one or more programmable processors of a provider edge device (PE) of a plurality of PEs to:
receive configuration data for an Ethernet Virtual Private Network (EVPN) instance to provide an EVPN over an intermediate network with one or more remote PEs, wherein the plurality of PEs are coupled to a multi-homed customer edge device (CE) for a customer network by an overlay network formed over an active-standby multi-link Ethernet segment; and
output, in response to a designated forwarder (DF) election to elect a DF for forwarding packets for the EVPN, an interior gateway protocol (IGP) routing protocol message comprising an indication of a routing distance for reaching a virtual network interface of the PE for the overlay network by a link of the Ethernet segment.

* * * * *